(12) United States Patent
Chen (10) Patent No.: US 6,724,105 B2
(45) Date of Patent: Apr. 20, 2004

(54) DUAL-DIRECTIONALLY OPERATED DYNAMO SET

(76) Inventor: Shi Hiu Chen, P.O. Box 65-45, Taichuang (TW), 403

( * ) Notice: Subject to any disclaimer, the term of this patent is extended or adjusted under 35 U.S.C. 154(b) by 0 days.

(21) Appl. No.: 10/237,806

(22) Filed: Sep. 10, 2002

(65) Prior Publication Data

US 2004/0046462 A1 Mar. 11, 2004

(51) Int. Cl.[7] .............................................. H02K 7/06
(52) U.S. Cl. ........................ 310/20; 310/83; 310/99
(58) Field of Search ........................... 310/20, 83, 99, 310/117, 118, 121; 290/1 C, 1 G; 36/2.6

(56) References Cited

U.S. PATENT DOCUMENTS

| | | | | |
|---|---|---|---|---|
| 3,898,488 A | * | 8/1975 | Erwin et al. ................ 310/41 |
| 4,250,420 A | * | 2/1981 | Grah et al. ................... 310/83 |
| 4,310,768 A | * | 1/1982 | Colley ......................... 290/1 C |
| 4,674,199 A | * | 6/1987 | Lakic ........................... 36/2.6 |
| 5,343,774 A | * | 9/1994 | Jang ........................... 74/421 A |
| 5,446,326 A | * | 8/1995 | Scheider ..................... 310/83 |
| 6,232,684 B1 | * | 5/2001 | Haag et al. ............... 310/68 R |

* cited by examiner

Primary Examiner—Thanh Lam (57) ABSTRACT

A dual-directionally operated dynamo set includes a housing, an actuating mechanism slidably mounted in the housing in a reciprocal manner, a dual-motion structure mounted in the housing and driven by the actuating mechanism, and a dynamo device mounted in the housing and driven by the dual-motion structure. Thus, the generator of the dynamo device may be operated successively to generate the electric power along dual directions in a reciprocal manner without stopping, thereby enhancing the generation efficiency of the electric power.

12 Claims, 7 Drawing Sheets

DUAL-DIRECTIONALLY OPERATED DYNAMO SET

BACKGROUND OF THE INVENTION

1. Field of the Invention

The present invention relates to a dual-directionally operated dynamo set that may be used by the user's hand and foot, and more particularly to a dual-directionally operated dynamo set that may generate the electric power in dual directions (clockwise or counterclockwise) in a reciprocally manner without stopping, thereby enhancing the generation efficiency of the electric power.

2. Description of the Related Art

A conventional dynamo device may be used to generate the electric power. However, the conventional dynamo device may be used to generate the electric power only when it is operated, and the electric power produced by the conventional dynamo device cannot be stored. In addition, the conventional dynamo device may generate the electric power when it is pressed, and will idle (and cannot generate the electric power) when it is restored to its original state, so that the conventional dynamo device can be operated in a single direction only, thereby limiting the versatility of the conventional dynamo device.

The closest prior art references of which the applicant is aware are disclosed in U.S. Pat. No. 5,167,082 and U.S. Pat. No. 5,495,682.

SUMMARY OF THE INVENTION

The present invention has arisen to mitigate and/or obviate the disadvantage of the conventional dynamo device.

The primary objective of the present invention is to provide a dual-directionally operated dynamo set that may generate the electric power in dual directions (clockwise or counterclockwise) in a reciprocally manner.

Another objective of the present invention is to provide a dual-directionally operated dynamo set, wherein the driven gear of the dynamo device may be successively rotated at the same direction, so that the generator of the dynamo device may be operated successively to generate the electric power without stopping.

A further objective of the present invention is to provide a dual-directionally operated dynamo set, wherein the generator of the dynamo device may be operated successively to generate the electric power without stopping, thereby enhancing the generation efficiency of the electric power.

A further objective of the present invention is to provide a dual-directionally operated dynamo set, wherein the electric power may be stored in the capacitor, and may be output from the output terminal for use of different appliances, thereby enhancing the versatility of the dual-directionally operated dynamo set of the present invention.

In accordance with the present invention, there is provided a dual-directionally operated dynamo set, comprising a housing, an actuating mechanism slidably mounted in the housing in a reciprocal manner, a dual-motion structure mounted in the housing and driven by the actuating mechanism, and a dynamo device mounted in the housing and driven by the dual-motion structure, wherein:

the dual-motion structure includes a positioning plate mounted in the housing, the positioning plate is formed with formed with an oblique first slide slot and an oblique second slide slot;

the dual-motion structure further includes a drive gear rotatably mounted between the positioning plate and a bottom of the housing and driven by the actuating mechanism;

the dual-motion structure further includes a first driving gear and a second drive gear each rotatably mounted between the positioning plate and the bottom of the housing and each meshing with the drive gear, the first driving gear may slide in the first slide slot of the positioning plate and may be rotated and moved by the drive gear to operate the dynamo device, the second drive gear may slide in the second slide slot of the positioning plate;

the dual-motion structure further includes a torsion spring mounted on the drive gear and having a first end urged on the first driving gear and a second end urged on the second drive gear; and the dual-motion structure further includes an idler rotatably mounted between the positioning plate and the bottom of the housing, so that the second drive gear may be rotated and moved by the drive gear to mesh with the idler to operate the dynamo device.

Further benefits and advantages of the present invention will become apparent after a careful reading of the detailed description with appropriate reference to the accompanying drawings.

DETAILED DESCRIPTION OF THE INVENTION

Referring to the drawings and initially to FIGS. 1–4, a dual-directionally operated dynamo set in accordance with a preferred embodiment of the present invention comprises a housing 10, an actuating mechanism 20 slidably mounted in the housing 10 in a reciprocal manner, a dual-motion structure 30 mounted in the housing 10 and driven by the actuating mechanism 20, and a dynamo device 40 mounted in the housing 10 and driven by the dual-motion structure 30. The dynamo device 40 includes a generator 42, and a capacitor 46, so that the electric power may be stored in the capacitor 46, thereby facilitating use of the user.

The housing 10 has one end formed with a guide channel 11, and has two side walls each formed with an opening 12. One of the two side walls of the housing 10 is formed with a receiving hole 14 for receiving the capacitor 46 of the dynamo device 40. The housing 10 has a bottom provided with multiple upward extending threaded posts 13 for locking the dual-motion structure 30. A cover plate 15 is mounted on a top of the housing 10, and is formed with a slide hole 16 aligning with the guide channel 11 of the housing 10. The cover plate 15 has two sides each provided with a retaining bar 17 aligning with the opening 12 of the housing 10 for retaining the actuating mechanism 20.

The actuating mechanism 20 may slide in the housing 10 in a reciprocal manner, and includes a slide bar 22 slidably mounted in the guide channel 11 of the housing 10 and provided with a rack face 23, a press bar 21 secured on a top of the slide bar 22 for pressing the slide bar 22, and an elastic member 24 mounted between a bottom of the slide bar 22 and the housing 10, so that the press bar 21 and the slide bar 22 may be restored to the original position by the restoring force of the elastic member 24. A shaft 25 is rotatably mounted in the housing 10, and is retained by the openings 12 of the two side walls of the housing 10. An actuating gear 26 is secured on the shaft 25 for rotating the shaft 25, and meshes with the rack face 23 of the slide bar 22. Two opposite engaging gears 27 are secured on the shaft 25 to rotate therewith. A first axle 28 is rotatably mounted in the housing 10, and is provided with a first larger gear 280 and a first smaller gear 281. The first smaller gear 281 of the first axle 28 meshes with the opposite engaging gears 27 of the shaft 25. A second axle 29 is rotatably mounted in the housing 10, and is provided with a second larger gear 290 and a second smaller gear 291. The second smaller gear 291 of the second axle 29 meshes with the first larger gear 280 of the first axle 28. The second larger gear 290 of the second axle 29 may be used to operate the dual-motion structure 30.

The dual-motion structure 30 is mounted in the housing 10 and driven by the actuating mechanism 20. The dual-motion structure 30 includes a positioning plate 31 mounted on the threaded posts 13 of the housing 10. The positioning plate 31 is formed with multiple shaft holes, and is formed with an oblique first slide slot 32 and an oblique second slide slot 33. A drive gear 34 is rotatably mounted between the positioning plate 31 and the bottom of the housing 10, and meshes with the second larger gear 290 of the second axle 29.

The dual-motion structure 30 further includes a first driving gear 35 and a second drive gear 36 each rotatably mounted between the positioning plate 31 and the bottom of the housing 10 and each meshing with the drive gear 34. The first driving gear 35 may slide in the first slide slot 32 of the positioning plate 31, and the second drive gear 36 may slide in the second slide slot 33 of the positioning plate 31. A torsion spring 37 is mounted on the drive gear 34, and has a first end urged on the first driving gear 35 and a second end urged on the second drive gear 36. An idler 38 is rotatably mounted between the positioning plate 31 and the bottom of the housing 10. Thus, the second drive gear 36 may be moved to mesh with the idler 38 to operate the dynamo device 40. Alternatively, the first driving gear 35 may be moved to operate the dynamo device 40.

The dynamo device 40 is mounted in the housing 10 and driven by the dual-motion structure 30. The dynamo device 40 includes a fixing plate 41 locked on the positioning plate 31 of the dual-motion structure 30, and a generator 42 locked on the fixing plate 41 and provided with a driven gear 43 which is extended through the positioning plate 31 of the dual-motion structure 30 and meshes with the idler 38 of the dual-motion structure 30. The dynamo device 40 futher includes an input socket 44 connected to the generator 42, and a circuit board 45 connected to the input socket 44. The circuit board 45 is mounted on one of the two side walls of the housing 10, and is provided with the capacitor 46 received in the receiving hole 14 of the housing 10. The circuit board 45 is also provided with a light emitting body 47 whose power is supplied by the capacitor 46, a push button 48 for controlling the light emitting body 47, and an output terminal 49 extending outward from the housing 10 for use of different appliances.

Figure 1:
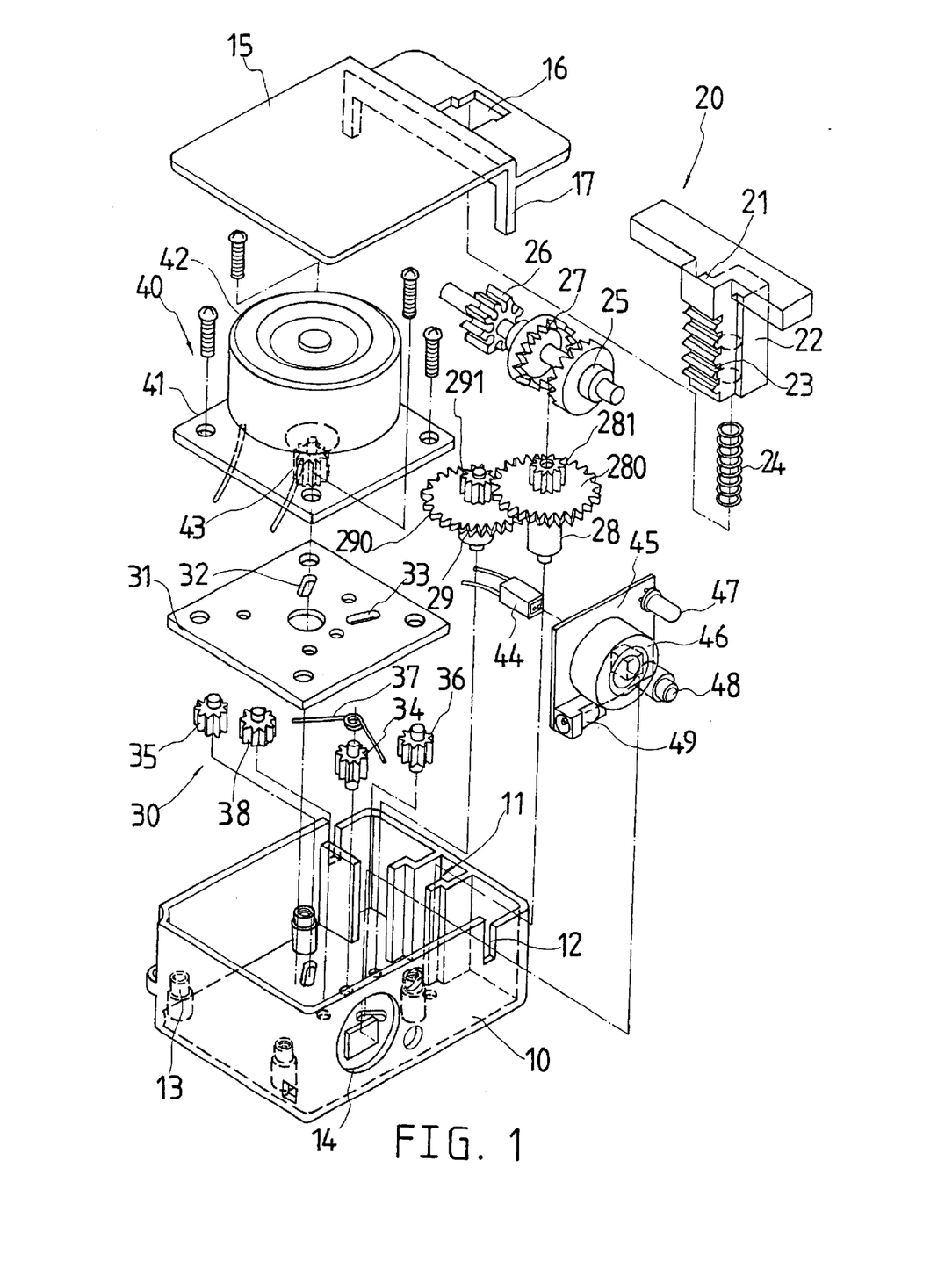
FIG. 1 is an exploded perspective view of a dual-directionally operated dynamo set in accordance with a preferred embodiment of the present invention.
Figure 2:
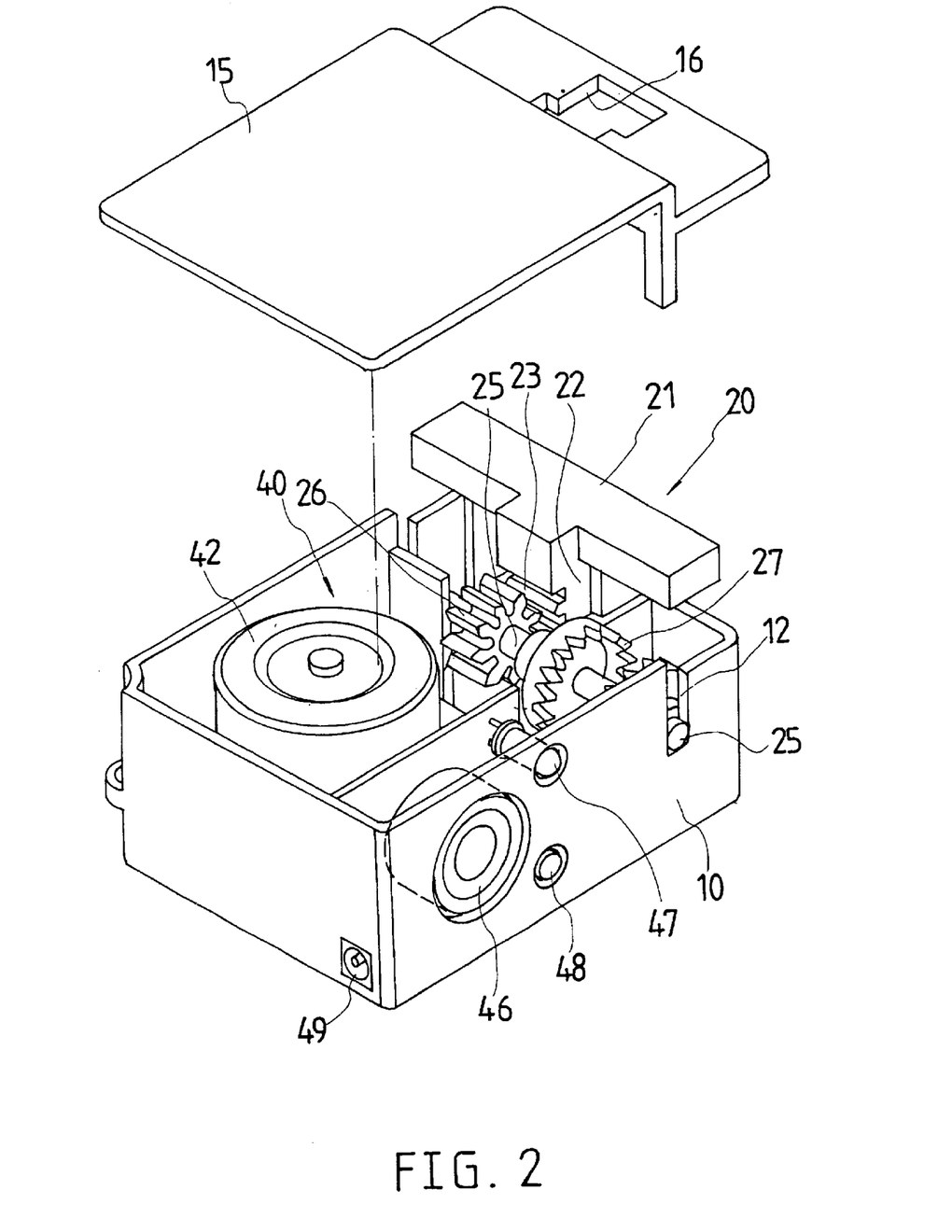
FIG. 2 is a locally perspective assembly view of the dual-directionally operated dynamo set in accordance with the preferred embodiment of the present invention.
Figure 3:
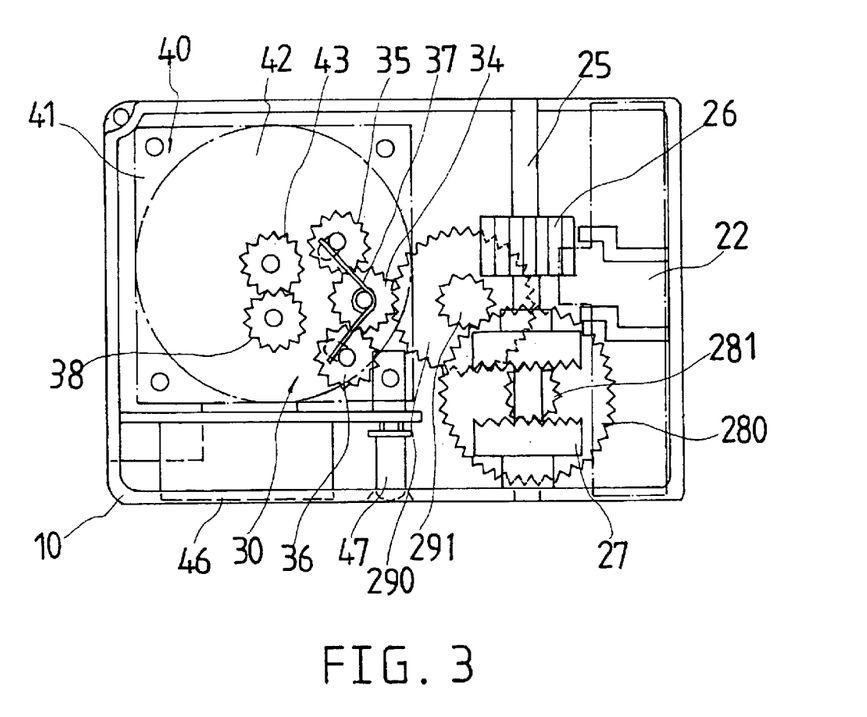
FIG. 3 is a top plan assembly view of the dual-directionally operated dynamo set as shown in FIG. 1.
Figure 4:
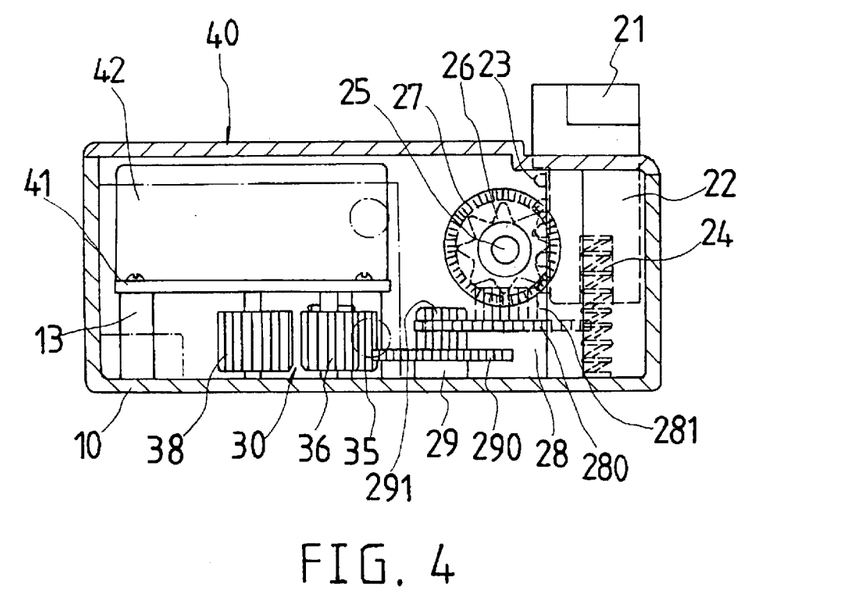
FIG. 4 is a side plan cross-sectional assembly view of the dual-directionally operated dynamo set as shown in FIG. 1.
Figure 5A:
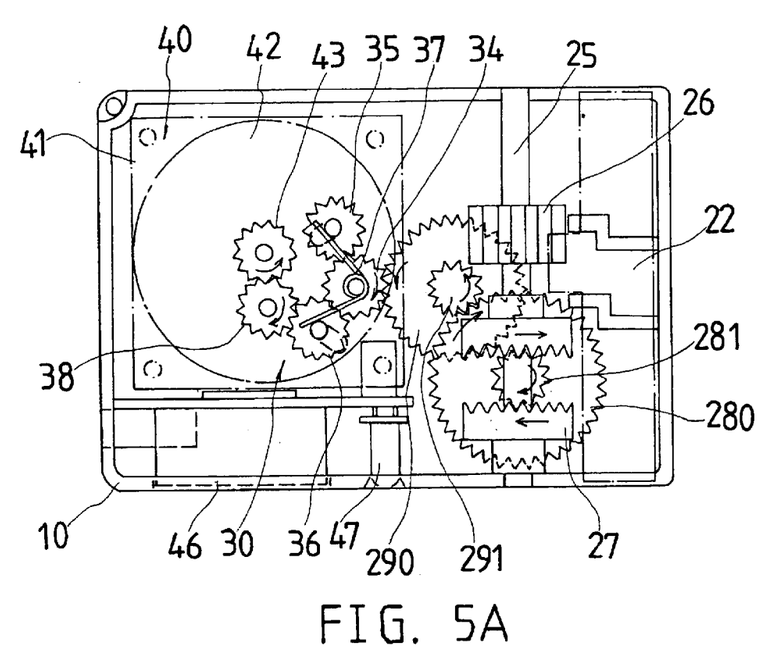
FIG. 5A is a schematic operational view of the dual-directionally operated dynamo set as shown in FIG. 3 in use.

In operation, referring to FIG. 5A with reference to FIGS. 1–4, when the press bar 21 of the actuating mechanism 20 is pressed downward, the slide bar 22 may be pressed downward to move downward the rack face 23 which rotates the actuating gear 26 which rotates the shaft 25 which rotates the two opposite engaging gears 27 which rotate the first smaller gear 281 of the first axle 28, so that the first larger gear 280 of the first axle 28 may be rotated clockwise by the first smaller gear 281 of the first axle 28. Then, the second smaller gear 291 of the second axle 29 may be rotated counterclockwise by the first larger gear 280 of the first axle 28, and the second larger gear 290 of the second axle 29 may be rotated counterclockwise by the second smaller gear 291 of the second axle 29. Then, the drive gear 34 of the dual-motion structure 30 may be rotated clockwise by the second larger gear 290 of the second axle 29, and the torsion spring 37 may be rotated clockwise by the drive gear 34, so that the first driving gear 35 may be pushed backward by the torsion spring 37 to detach from the driven gear 43 of the dynamo device 40, and the second drive gear 36 may be rotated counterclockwise and moved forward by the drive gear 34 to mesh with the idler 38, so that the idler 38 may be rotated clockwise by the second drive gear 36, and the driven gear 43 of the dynamo device 40 may be rotated counterclockwise by the idler 38 as shown in FIG. 5A, so that the generator 42 of the dynamo device 40 may be operated.

Figure 5B:
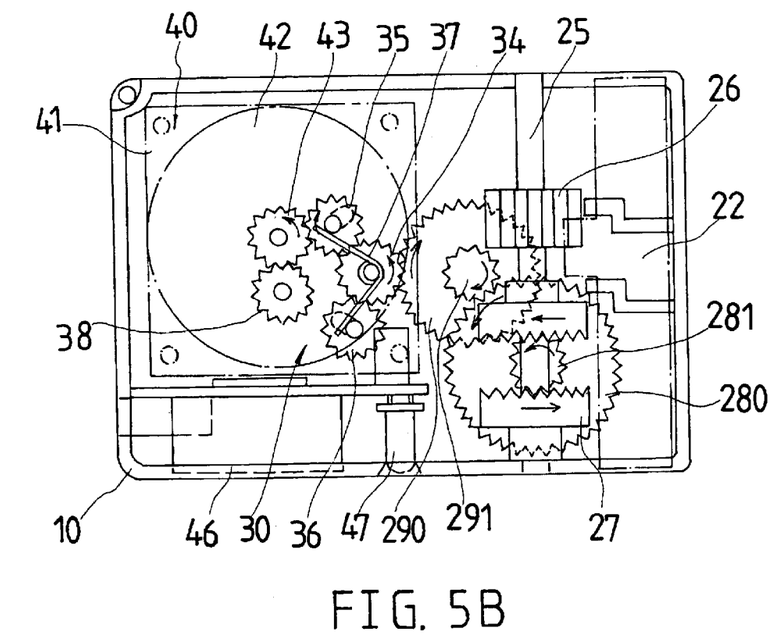
FIG. 5B is a schematic operational view of the dual-directionally operated dynamo set as shown in FIG. 3 in use.

On the contrary, referring to FIG. 5B with reference to FIGS. 1–4, when the pressing force applied on the press bar 21 of the actuating mechanism 20 is removed, the slide bar 22 may be pushed and moved upward to the original position by the restoring force of the elastic member 24 so as to move upward the rack face 23 which rotates the actuating gear 26 which rotates the shaft 25 which rotates the two opposite engaging gears 27 which rotate the first smaller gear 281 of the first axle 28, so that the first larger gear 280 of the first axle 28 may be rotated counterclockwise by the first smaller gear 281 of the first axle 28. Then, the second smaller gear 291 of the second axle 29 may be rotated clockwise by the first larger gear 280 of the first axle 28, and the second larger gear 290 of the second axle 29 may be rotated clockwise by the second smaller gear 291 of the second axle 29. Then, the drive gear 34 of the dual-motion structure 30 may be rotated counterclockwise by the second larger gear 290 of the second axle 29, and the torsion spring 37 may be rotated counterclockwise by the drive gear 34, so that the second drive gear 36 may be pushed backward by the torsion spring 37 to detach from the idler 38 and the first driving gear 35 may be rotated clockwise and moved forward by the drive gear 34 to mesh with the driven gear 43 of the dynamo device 40, the driven gear 43 of the dynamo device 40 may be rotated counterclockwise by the first driving gear 35 as shown in FIG. 5B, so that the generator 42 of the dynamo device 40 may be operated successively without stopping.

Figure 6:
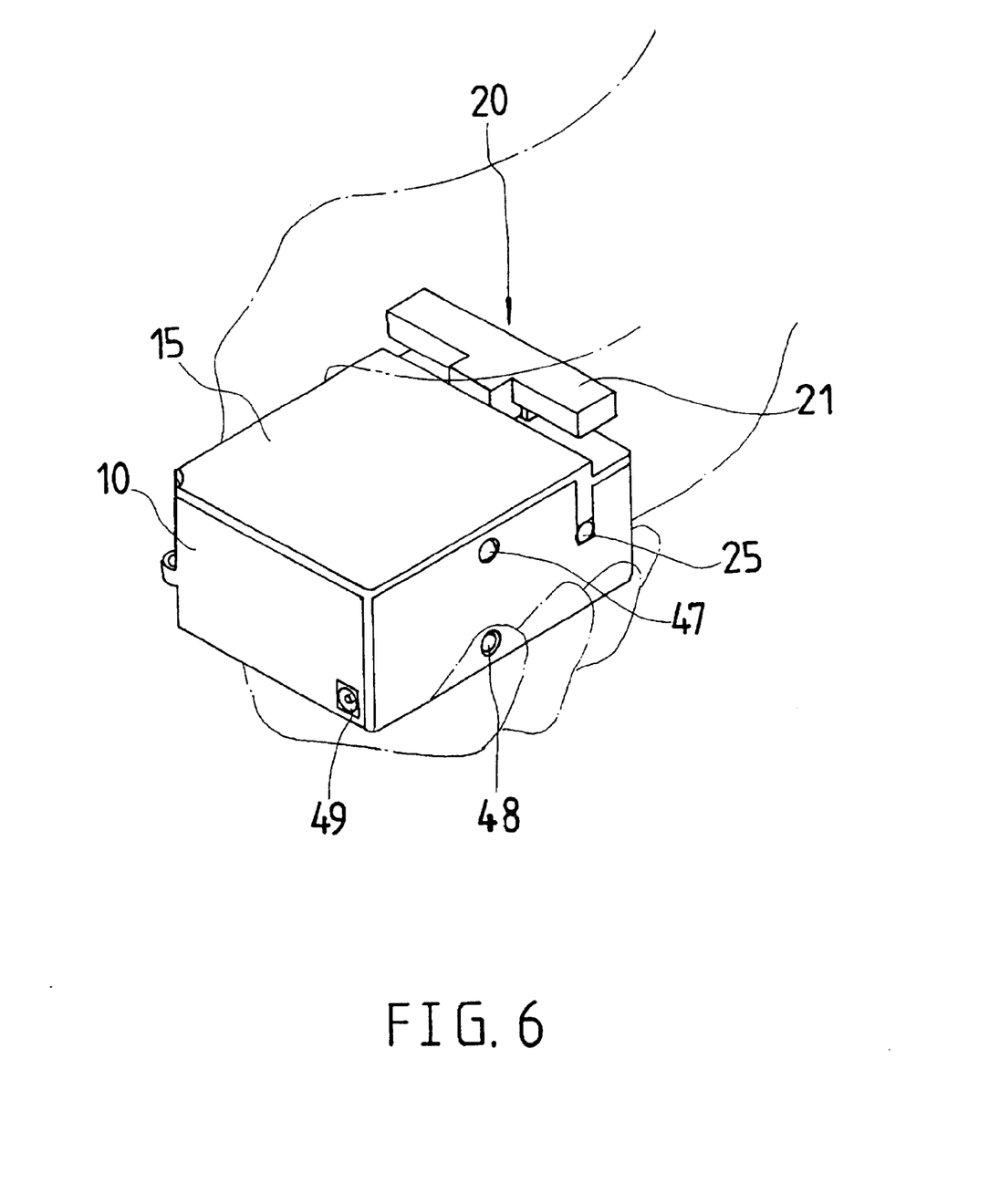
FIG. 6 is a schematic perspective view of the practice state of the dual-directionally operated dynamo set in accordance with a preferred embodiment of the present invention.

Referring to FIG. 6, the user's one hand may hold the dual-directionally operated dynamo set of the present invention and may press and release the press bar 21 of the actuating mechanism 20 in an intermittent manner, so that the generator 42 of the dynamo device 40 may be operated successively to generate the electric power without stopping, and the electric power may be stored in the capacitor 46. Thus, the user may presses the push button 48, so that the light emitting body 47 may emit light. Alternatively, the electric power may be output from the output terminal 49 for use of different appliances.

Figure 7A:
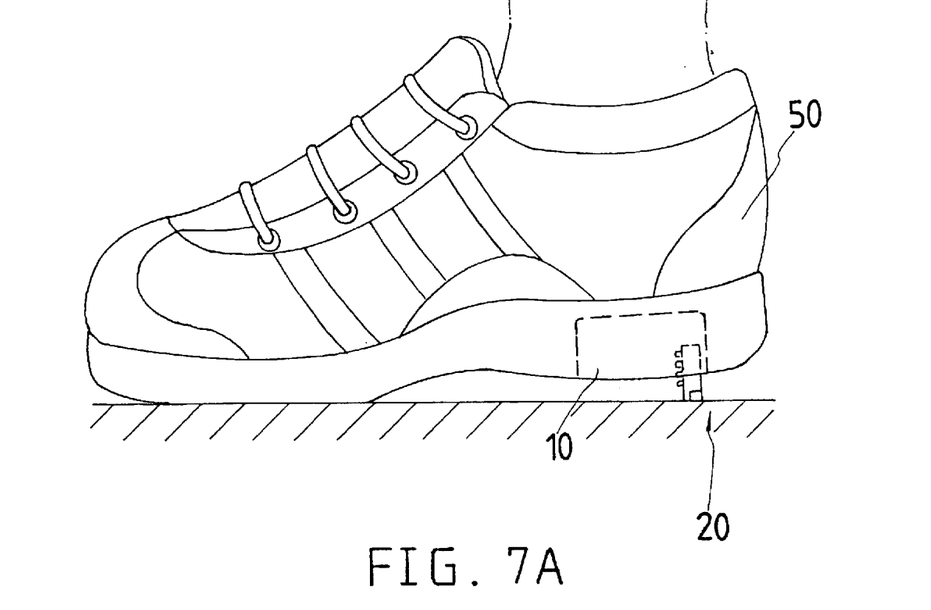
FIG. 7A is a schematic side plan view of the practice state of the dual-directionally operated dynamo set in accordance with a preferred embodiment of the present invention.
Figure 7B:
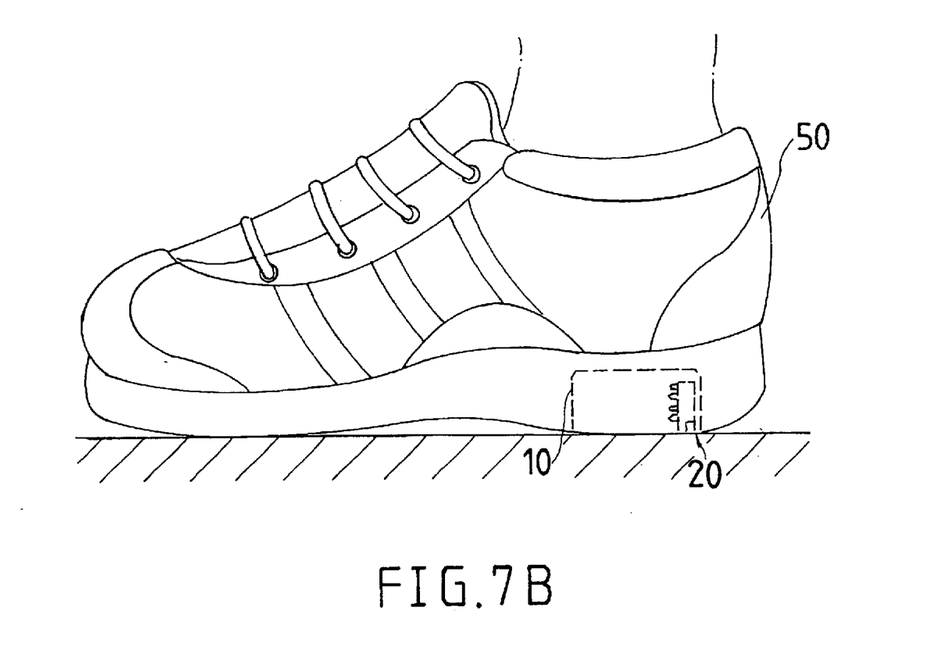
FIG. 7B is a schematic side plan view of the practice state of the dual-directionally operated dynamo set in accordance with the preferred embodiment of the present invention.

Referring to FIGS. 7A and 7B, the dual-directionally operated dynamo set of the present invention may be mounted on the sole 50 of one of a pair of shoes, with the press bar 21 of the actuating mechanism 20 protruding outward from the sole. When the shoes are stepped on the road as shown in FIG. 7B, the press bar 21 of the actuating mechanism 20 may be pressed, and when the shoes are detached from the road as shown in FIG. 7A, the press bar 21 of the actuating mechanism 20 may be released. In such a manner, the generator 42 of the dynamo device 40 may be operated successively as shown in FIGS. 5A and 5B to generate the electric power without stopping, and the electric power may be stored in the capacitor 46.

Figure 8:
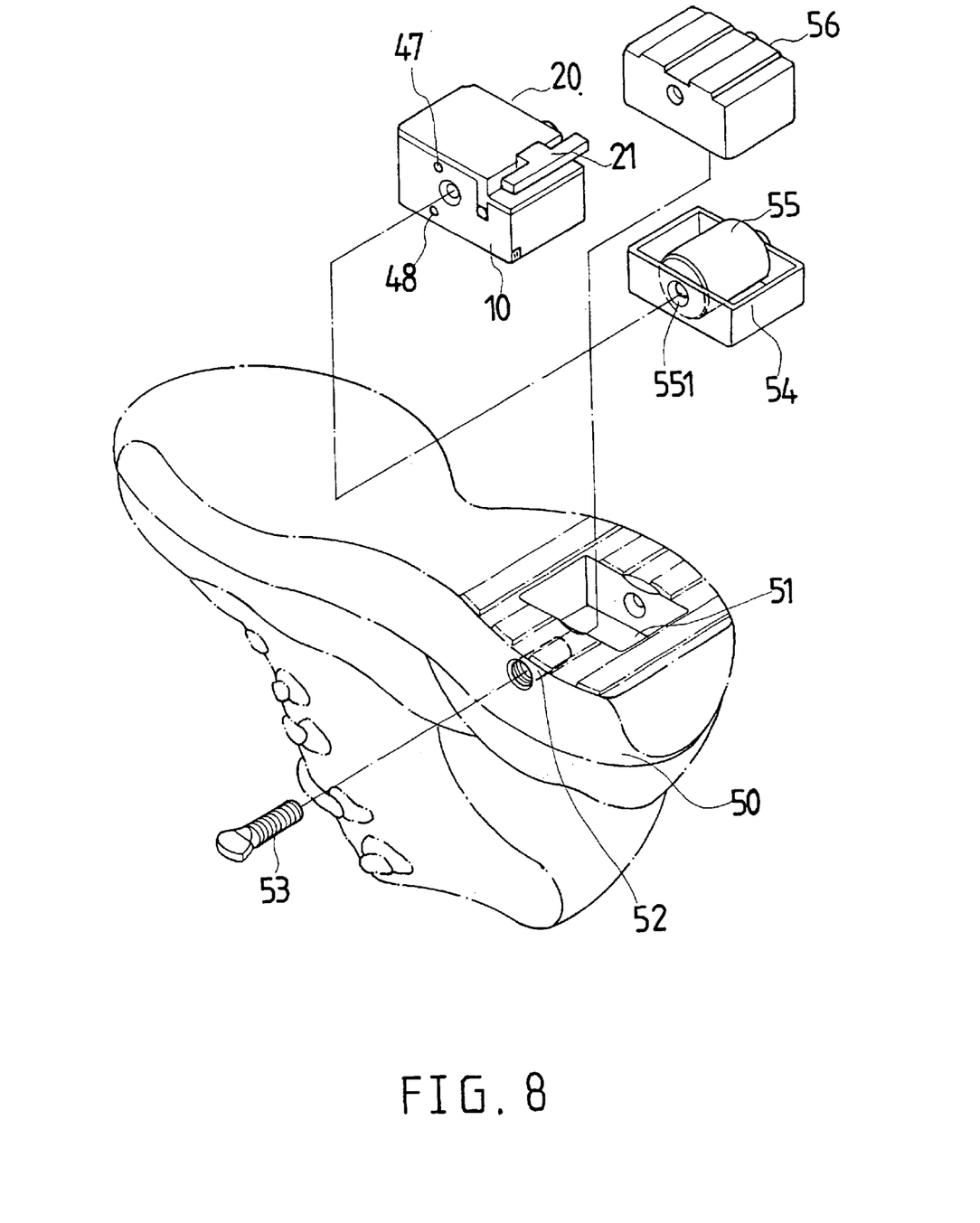
FIG. 8 is a bottom perspective view showing the dual-directionally operated dynamo set of the present invention is used on the sole of one of a pair of shoes.

Referring to FIG. 8, the sole 50 is formed with a chamber 51 for receiving the dynamo device 40. The chamber 51 has a side wall formed with a rotation hole 52 for insertion of a rotation shaft 53 which may be rotated in the rotation hole 52 to press the push button 48 of the dynamo device 40, thereby starting the light emitting body 47 to emit light. In addition, a casing 54 may be mounted in the chamber 51, and is provided with a roller 55 which is formed with a shaft hole 551. Thus, the rotation shaft 53 may be rotated into the shaft hole 551 of the roller 55, thereby fixing the casing 54 and the roller 55, so that the roller 55 may be rotated freely. When not in use, a plug 56 may be inserted into the chamber 51, and the rotation shaft 53 may be rotated into the plug 56, thereby sealing the chamber 51.

Accordingly, the dual-directionally operated dynamo set of the present invention has the following advantages.

1. Whenever the press bar 21 of the actuating mechanism 20 is pressed or released, the driven gear 43 of the dynamo device 40 may be successively rotated at the same direction, so that the generator 42 of the dynamo device 40 may be operated successively in dual directions (clockwise or counterclockwise) to generate the electric power without stopping.

2. The driven gear 43 of the dynamo device 40 may be successively rotated, and the generator 42 of the dynamo device 40 may be operated successively to generate the electric power without stopping, thereby greatly enhancing the generation efficiency of the electric power.

3. The electric power may be stored in the capacitor 46, and may be output from the output terminal 49 for use of different appliances, thereby enhancing the versatility of the dual-directionally operated dynamo set of the present invention.

While the preferred embodiment of the present invention has been shown and described, it will be apparent to those skilled in the art that various modifications may be made in the embodiment without departing from the spirit of the present invention. Such modifications are all within the scope of the present invention.

What is claimed is:

1. A dual-directionally operated dynamo set, comprising a housing, an actuating mechanism slidably mounted in the housing in a reciprocal manner, a dual-motion structure mounted in the housing and driven by the actuating mechanism, and a dynamo device mounted in the housing and driven by the dual-motion structure, wherein:

the dual-motion structure includes a positioning plate mounted in the housing, the positioning plate is formed with formed with an oblique first slide slot and an oblique second slide slot;

the dual-motion structure further includes a drive gear rotatably mounted between the positioning plate and a bottom of the housing and driven by the actuating mechanism;

the dual-motion structure further includes a first driving gear and a second drive gear each rotatably mounted between the positioning plate and the bottom of the housing and each meshing with the drive gear, the first driving gear may slide in the first slide slot of the positioning plate and may be rotated and moved by the drive gear to operate the dynamo device, the second drive gear may slide in the second slide slot of the positioning plate;

the dual-motion structure further includes a torsion spring mounted on the drive gear and having a first end urged on the first driving gear and a second end urged on the second drive gear; and the dual-motion structure further includes an idler rotatably mounted between the positioning plate and the bottom of the housing, so that the second drive gear may be rotated and moved by the drive gear to mesh with the idler to operate the dynamo device.

2. The dual-directionally operated dynamo set in accordance with claim 1, wherein the actuating mechanism includes a slide bar slidably mounted in the housing and provided with a rack face, a press bar secured on a top of the slide bar for pressing the slide bar, an elastic member mounted between a bottom of the slide bar and the housing, a shaft rotatably mounted in the housing, an actuating gear secured on the shaft for rotating the shaft and meshing with the rack face of the slide bar, two opposite engaging gears secured on the shaft to rotate therewith, a first axle rotatably mounted in the housing and provided with a first larger gear and a first smaller gear which meshes with the two engaging gears of the shaft, and a second axle rotatably mounted in the housing and provided with a second larger gear meshing with the drive gear of the dual-motion structure and a second smaller gear meshing with the first larger gear of the first axle.

3. The dual-directionally operated dynamo set in accordance with claim 1, wherein the housing has one end formed with a guide channel, and the slide bar of the actuating mechanism is slidably mounted in the guide channel of the housing.

4. The dual-directionally operated dynamo set in accordance with claim 1, wherein the housing has two side walls each formed with an opening, and the shaft of the actuating mechanism is rotatably mounted in the housing and retained by the openings of the two side walls of the housing.

5. The dual-directionally operated dynamo set in accordance with claim 1, wherein the dynamo device includes a fixing plate locked on the positioning plate of the dual-motion structure, and a generator locked on the fixing plate and provided with a driven gear which is extended through the positioning plate of the dual-motion structure and meshes with the idler of the dual-motion structure.

6. The dual-directionally operated dynamo set in accordance with claim 5, wherein the dynamo device further includes an input socket connected to the generator, and a circuit board connected to the input socket.

7. The dual-directionally operated dynamo set in accordance with claim 6, wherein the housing has one side wall formed with a receiving hole, and the circuit board is mounted on the one side wall of the housing, and is provided with a capacitor received in the receiving hole of the housing.

8. The dual-directionally operated dynamo set in accordance with claim 7, wherein the circuit board is provided with a light emitting body whose power is supplied by the capacitor, and a push button for controlling the light emitting body.

9. The dual-directionally operated dynamo set in accordance with claim 6, wherein the circuit board is provided with an output terminal extending outward from the housing for use of different appliances.

10. The dual-directionally operated dynamo set in accordance with claim 3, further comprising a cover plate mounted on a top of the housing and formed with a slide hole aligning with the guide channel of the housing for passage of the slide bar of the actuating mechanism.

11. The dual-directionally operated dynamo set in accordance with claim 4, further comprising a cover plate mounted on a top of the housing, wherein the cover plate has two sides each provided with a retaining bar aligning with the opening of the housing for retaining the shaft of the actuating mechanism.

12. The dual-directionally operated dynamo set in accordance with claim 1, wherein the bottom of the housing is provided with multiple upward extending threaded posts, and the positioning plate of the dual-motion structure is mounted on the threaded posts of the housing.

\* \* \* \* \*